United States Patent
Nagasawa

(10) Patent No.: US 10,486,639 B2
(45) Date of Patent: Nov. 26, 2019

(54) OCCUPANT PROTECTION DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 68 days.

(21) Appl. No.: 15/850,468

(22) Filed: Dec. 21, 2017

(65) Prior Publication Data

US 2018/0272985 A1    Sep. 27, 2018

(30) Foreign Application Priority Data

Mar. 27, 2017  (JP) ................. 2017-060282

(51) Int. Cl.
*B60R 21/232*  (2011.01)
*B60R 21/2338* (2011.01)
(Continued)

(52) U.S. Cl.
CPC .......... *B60R 21/232* (2013.01); *B60R 21/231* (2013.01); *B60R 21/2338* (2013.01); *B60R 2021/0044* (2013.01); *B60R 2021/0048* (2013.01); *B60R 2021/0058* (2013.01); *B60R 2021/23192* (2013.01); *B60R 2021/23386* (2013.01)

(58) Field of Classification Search
CPC .............. B60R 21/232; B60R 21/233; B60R 2021/23386; B60R 2021/23192
See application file for complete search history.

(56) References Cited

U.S. PATENT DOCUMENTS 3,774,936 A * 11/1973 Barnett ................. B60R 21/214
                                              280/730.1
5,566,972 A * 10/1996 Yoshida .............. B60R 21/2171
                                              280/728.2
(Continued)

FOREIGN PATENT DOCUMENTS

CN     202429165 U    9/2012
JP     H07-125591 A   5/1995
(Continued)

OTHER PUBLICATIONS

Strutz et al., Safety Device for a Vehicle, Particularly a Motor Vehicle, Jun. 17, 2004, EPO, WO 2004/050435 A1, English Abstract (Year: 2004).*

(Continued)

*Primary Examiner* — James A English
(74) *Attorney, Agent, or Firm* — Smith, Gambrell & Russell, LLP

(57) ABSTRACT

An occupant protection device includes a vertical air bag. The vertical air bag is deployable downward at least from above a shoulder of an occupant seated in a seat of a vehicle. During deployment, the vertical air bag is bent in such a manner that a deployed direction distal end portion is, at a portion in front of an upper body of the occupant seated in the seat, oriented towards a waist of the occupant. During the development, in a state in which the vertical air bag is bent, the deployed direction distal end portion comes in contact with a frontal portion of the occupant seated in the seat.

20 Claims, 9 Drawing Sheets

(51) Int. Cl.
*B60R 21/231* (2011.01)
*B60R 21/00* (2006.01)

(56) References Cited

U.S. PATENT DOCUMENTS

| | | | | |
|---|---|---|---|---|
| 6,460,878 | B2* | 10/2002 | Eckert | B60R 21/232 280/730.1 |
| 6,722,691 | B1* | 4/2004 | Håland | B60R 21/16 280/730.1 |
| 2004/0256841 | A1* | 12/2004 | Bakhsh | B60R 21/02 280/730.1 |
| 2005/0023806 | A1* | 2/2005 | Higuchi | B60R 21/231 280/730.1 |
| 2005/0206138 | A1* | 9/2005 | Breuninger | B60R 21/231 280/729 |
| 2010/0225096 | A1* | 9/2010 | Bustos Garcia | B60R 21/214 280/730.1 |
| 2012/0049492 | A1 | 3/2012 | Choi et al. | |
| 2012/0080869 | A1* | 4/2012 | Lee | B60R 21/214 280/729 |
| 2012/0133114 | A1* | 5/2012 | Choi | B60R 21/214 280/728.2 |
| 2013/0087995 | A1* | 4/2013 | Lee | B60R 21/214 280/728.2 |
| 2013/0292927 | A1 | 11/2013 | Lee et al. | |
| 2014/0375033 | A1* | 12/2014 | Fukawatase | B60R 21/214 280/729 |
| 2016/0107598 | A1* | 4/2016 | Fischer | B60R 21/231 280/729 |
| 2016/0311393 | A1* | 10/2016 | Smith | B60R 21/232 |
| 2017/0113646 | A1* | 4/2017 | Lee | B60R 21/2338 |

FOREIGN PATENT DOCUMENTS

| | | | |
|---|---|---|---|
| JP | 2005-035310 A | 2/2005 | |
| JP | 2010-235009 A | 10/2010 | |
| JP | 2012-046164 A | 3/2012 | |
| JP | 2013-082418 A | 5/2013 | |
| WO | WO-2004050435 A1 * | 6/2004 | B60R 21/214 |
| WO | 2016/064936 A1 | 4/2016 | |

OTHER PUBLICATIONS

Strutz et al., Safety Device for a Vehicle, Particularly a Motor Vehicle, Jun. 17, 2004, EPO, WO 2004/050435 A1, Machine Translation of Description (Year: 2004).*

Office Action received in Japanese Patent Application No. 2017-060282 dated Feb. 19, 2019 (3 pages in Japanese with English translation).

Office Action received in Japanese Patent Application No. 2017-060282 dated Oct. 30, 2018 (3 pages in Japanese with English translation).

* cited by examiner

OCCUPANT PROTECTION DEVICE

CROSS-REFERENCE TO RELATED APPLICATIONS

The present application claims priority from Japanese Patent Application No. 2017-060282 filed on Mar. 27, 2017, the entire contents of which are hereby incorporated by reference.

BACKGROUND

1. Technical Field

The present disclosure relates to a device that protects an occupant seated in a seat of an automobile.

2. Related Art

There is a device that protects an occupant seated in a seat of an automobile by using a seat belt and a front air bag (Japanese Unexamined Patent Application Publication (JP-A) No. 2010-235009).

The seat belt is typically a three-point seat belt and includes a lap portion around the waist of the occupant sitting in the seat, and a shoulder portion crossed diagonally across the front portion of the upper body. Furthermore, a retractor retracts the seat belt to reduce the slackness of the seat belt before a collision and restricts the seat belt from being sent out during the collision. With the above, the seat belt can be actuated to maintain the body of the occupant, which is about to move to the front from the seat during a collision, in a seated state in the seat.

The front air bag is, in an occupant compartment, provided in a steering wheel or a dashboard provided in front of the seat, and is deployed rearwardly towards the seat. Furthermore, the deployed front air bag supports the upper body of the occupant that is collapsing forward at the time of collision and absorbs the impact.

However, the occupant is not necessarily always protected appropriately against all forms of collision even when such an occupant protection device is used.

For example, in a case of a front collision as well, there is a possibility of the occupant seated in the seat being moved forward by the impact of the collision. Furthermore, when the waist of the occupant slides and moves forward from the sitting position of the seat, the upper body about to collapse forward about the waist, serving as an axis, collapses forward while the upper body is near the front air bag. In such a case, the state in which the front air bag and the upper body come into contact with each other is different from the anticipated state in which the waist is at the sitting position of the seat.

Furthermore, the behavior of the occupant during the collision changes by the adjusted front-rear position of the seat in the vehicle body, the body shape of the occupant seated in the seat, the sitting posture of the occupant, and the like.

As described above, a further improvement in the occupant protection performance is in need in the occupant protection device.

SUMMARY OF THE INVENTION

An aspect of the present disclosure provides an occupant protection device including a vertical air bag deployable downward at least from above a shoulder of an occupant seated in a seat of a vehicle. In the occupant protection device, during deployment, the vertical air bag is bent in such a manner that a deployed direction distal end portion is, at a portion in front of an upper body of the occupant seated in the seat, oriented towards a waist of the occupant. In a state in which the vertical air bag is bent, the deployed direction distal end portion comes in contact with a frontal portion of the occupant seated in the seat during the deployment.

DETAILED DESCRIPTION

Hereinafter, examples of the present disclosure will be described with reference to the drawings.

First Example

Figure 1A:
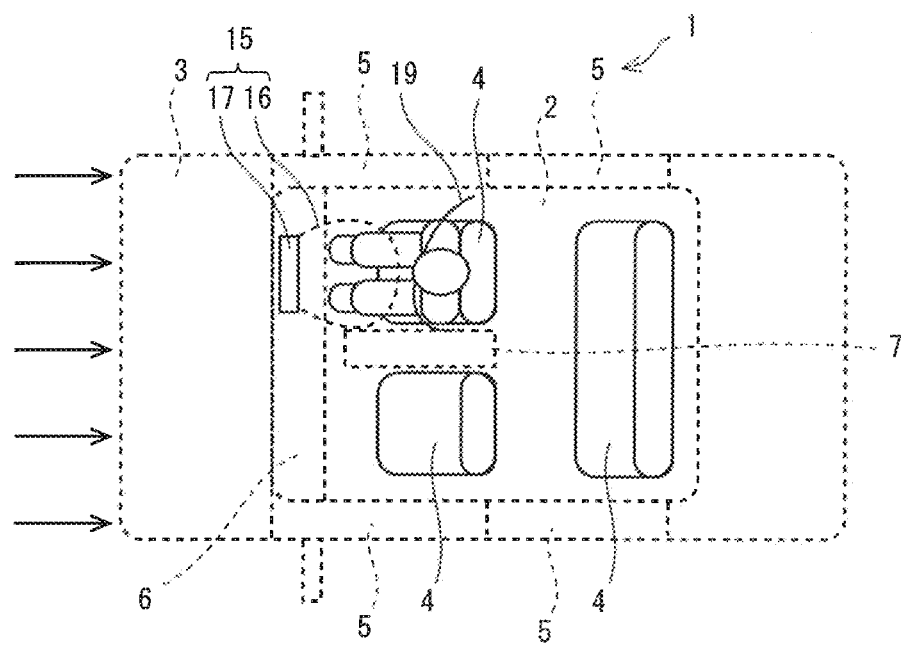
FIGS. 1A and 1B are explanatory drawings of an automobile to which an occupant protection device according to an example of the present disclosure can be applied.
Figure 1B:
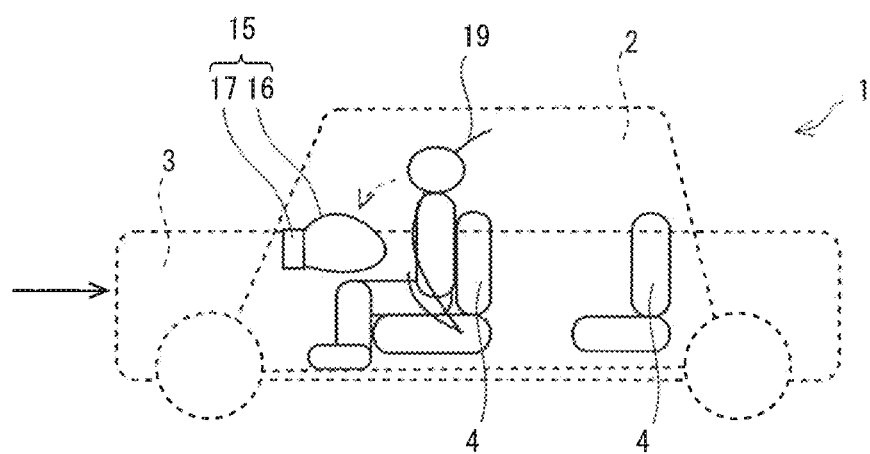

FIGS. 1A and 1B are explanatory drawings of an automobile 1 to which an occupant protection device 10 according to an example of the present disclosure can be applied.

The automobile 1 is an example of a vehicle. The automobile 1 includes a vehicle body 3 in which an occupant compartment 2 is formed. Two front seats 4 and a rear seat 4, in which occupants sit, provided facing forward in the occupant compartment 2 are provided in the occupant compartment 2. Doors 5 that are opened and closed for the occupant to get on and get off the vehicle are provided on both the left and right sides of the occupant compartment 2. A dashboard 6 having a length corresponding to the left and right width of the occupant compartment 2 is provided in front of the front seats 4. A center console 7 is provided between the two front seats 4.

Incidentally, a device that protects an occupant sitting in the seat 4 when the automobile 1 collides with another automobile is provided in the automobile 1.

A seat belt 19 and a front air bag 16 are illustrated in FIGS. 1A and 1B.

Typically, the seat belt 19 is a three-point seat belt. The three-point seat belt 19 includes a lap portion around the waist of the occupant sitting in the seat 4, and a shoulder portion crossed diagonally across the front portion of the upper body. Furthermore, a retractor (not shown) retracts the seat belt 19 to reduce the slackness of the seat belt 19 before a collision and restricts the seat belt 19 from being sent out during the collision. With the above, the seat belt 19 can be actuated to maintain the body of the occupant, which is about to move to the front from the seat 4 during a collision, in a seated state in the seat 4.

The front air bag 16 is, in the occupant compartment 2, provided in a steering wheel or the dashboard 6 provided in front of the seat 4, and is deployed rearwardly towards the seat 4. Furthermore, the deployed front air bag 16 is capable of supporting the upper body of the occupant that is collapsing forward at the time of collision and is capable of absorbing the impact.

However, the occupant is not necessarily always protected appropriately against all forms of collision even when such an occupant protection device is used. For example, even a head-on collision includes, at the least, forms of collision such as a full-lap collision, an off-set collision, and an oblique collision. Furthermore, if the forms of collision are different, the size and the direction of the impact force acting on the vehicle body 3 and the body of the occupant during collision will be different, and the behaviors of the vehicle body 3 and the occupant will be different.

Figure 2A:
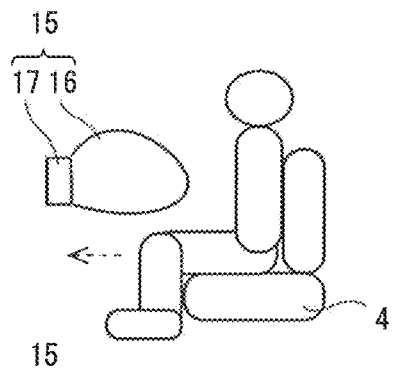
FIGS. 2A to 2C are explanatory drawings illustrating an example of a behavior of the occupant during a full-lap and head-on collision.
Figure 2B:
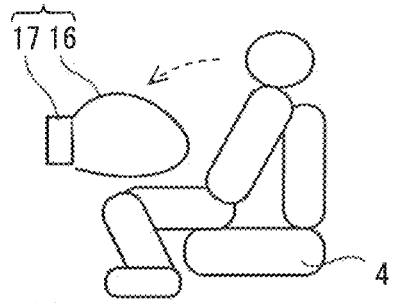
Figure 2C:
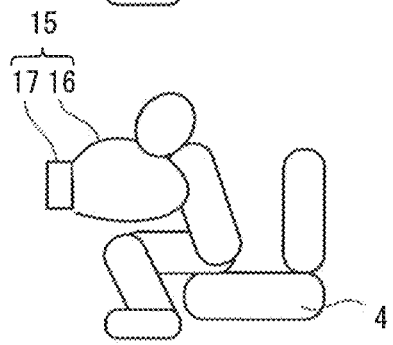

FIGS. 2A to 2C are explanatory drawings illustrating an example of a behavior of the occupant during a full-lap and head-on collision.

When a head-on collision occurs while the occupant is seated in the seat 4, as illustrated in FIG. 2A, a force relatively moving the occupant forward acts on the occupant sitting in the seat 4 due to the impact of the collision.

In such a case, if the occupant is not restrained by the seat belt 19, as illustrated in FIG. 2B, the waist of the occupant slides forward and moves from the sitting position of the seat 4.

Subsequently, the waist of the occupant stops when reaching a state in which the kneecaps, for example, hit the dashboard 6, and, as illustrated in FIG. 2C, the upper body of the occupant collapses forward from the waist, serving as an axis, at the above position.

Figure 3:
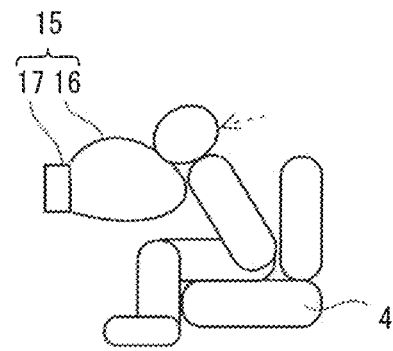
FIG. 3 is an explanatory drawing illustrating an exemplary state in which an upper body has collapsed while a waist of the occupant is, as it has been, at a sitting position of a seat.

Conversely, FIG. 3 is an explanatory drawing illustrating an exemplary state in which the upper body of the occupant has collapsed while the waist of the occupant is, as it has been, at the sitting position of the seat 4.

As it becomes apparent by making a comparison with FIG. 3, the state in which the upper body is in contact with the front air bag 16 in FIG. 2C is different from the anticipated state in FIG. 3 in which the waist is at the sitting position. The upper body of the occupant collapses forward at a position near the front air bag 16. The state in which the deployed front air bag 16 and the upper body come into contact with each other is different from the anticipated case in which the waist is at the sitting position of the seat 4. In such a case, the deployed front air bag 16 may not be able to appropriately support the collapsed upper body and absorb the impact.

Furthermore, the upper body will be collapsing forward abruptly in a short time after the movement of the waist has stopped.

Furthermore, the behavior of the occupant during the collision changes by the adjusted front-rear position of the seat 4 in the vehicle body 3, the body shape of the occupant seated in the seat 4, the sitting posture of the occupant, and the like.

As described above, a further improvement in the occupant protection performance of the occupant protection device is required.

Figure 4:
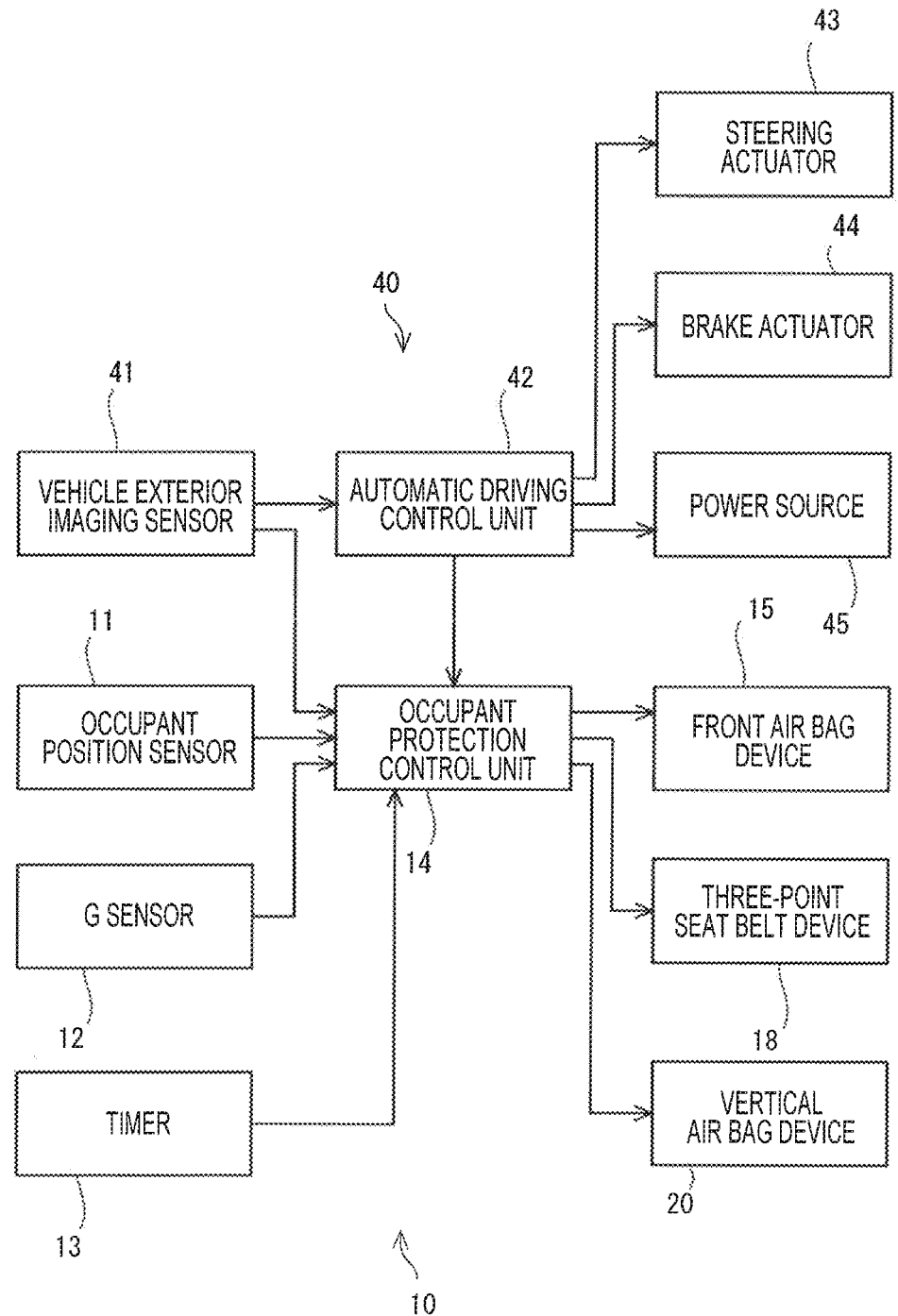
FIG. 4 is an explanatory drawing of an occupant protection device according to a first example.

FIG. 4 is an explanatory drawing of an occupant protection device 10 according to a first example.

In FIG. 4, an automatic driving control device 40 is illustrated together with the occupant protection device 10. The automatic driving control device 40 includes a vehicle exterior imaging sensor 41, an automatic driving control unit 42, a steering actuator 43, a break actuator 44, and a power source 45.

The vehicle exterior imaging sensor 41 captures images of a portion in front of the vehicle body 3, for example. With the above, for example, other vehicle bodies that approach the moving vehicle body 3 from the front can be captured as images.

Instead of the steering wheel, the steering actuator 43 drives a steering device of the automobile 1.

Instead of the brake pedal, the break actuator 44 drives a braking device of the automobile 1.

The power source 45 is a gasoline engine or an electric motor, for example.

The automatic driving control unit 42 automatically controls the traveling of the automobile 1. The automatic driving control unit 42 controls the steering actuator 43, the break actuator 44, and the power source 45 according to information on the travel route to the destination, for example. Furthermore, the automatic driving control unit 42 identifies an approaching object on the basis of an image taken by the vehicle exterior imaging sensor 41 and estimates the collision with the approaching object. Furthermore, in a case in which a collision with an approaching object is estimated, the automatic driving control unit 42 controls the steering actuator 43, the break actuator 44, and the power source 45 so as to avoid the collision.

The occupant protection device 10 in FIG. 4 includes an occupant position sensor 11, a G sensor 12, a timer 13, an occupant protection control unit 14, a front air bag device 15, a three-point seat belt device 18, and a vertical air bag device 20.

The occupant position sensor 11 detects the position of the head or the position of the upper body of the occupant seated in the seat 4. For example, having the sitting position with the back of the body against the seat 4 as a reference, the occupant position sensor 11 detects a forward movement or a movement in the left-right direction.

The G sensor 12 detects the acceleration acting on the automobile 1. The direction of the detected acceleration may be the front-rear direction, the left-right direction, and the up-down direction.

The timer 13 measures the clock time or the time period.

The front air bag device 15 is provided in front of the occupant seated in the seat 4. The front air bag device 15 is provided in the dashboard 6 or the steering wheel, for example. The front air bag device 15 includes the front air bag 16 and an inflator 17. By input of an ignition signal, the inflator 17 discharges gas into the front air bag 16. With the above, the front air bag 16 is deployed rearwardly towards the occupant seated in the seat 4. The front air bag 16 is deployed in front of the upper body of the occupant.

The three-point seat belt device 18 includes the seat belt 19. By having a tongue (not shown) be engaged with a buckle, the seat belt 19 forms the lap portion provided around the waist of the occupant seated in the seat 4, and the shoulder portion that is crossed diagonally across the upper body, that is, from one of the shoulders to the inside of the waist. Subsequently, by input of a pretension signal and a support signal, the retractor (not shown) retracts the seat belt 19. For example, the retractor retracts the seat belt 19 to reduce the slackness of the seat belt 19 before the collision and restricts the seat belt 19 from being sent out during the collision. With the above, the seat belt 19 can maintain the body of the occupant, which is about to move to the front from the seat 4 during the collision, in the seated state in the seat 4.

The vehicle exterior imaging sensor 41, the automatic driving control unit 42, the occupant position sensor 11, the G sensor 12, the timer 13, the front air bag device 15, the three-point seat belt device 18, the vertical air bag device 20 are connected to the occupant protection control unit 14.

The occupant protection control unit 14 determines a possibility of a collision with information from the sensor. Furthermore, when there is a possibility of a collision, the occupant protection control unit 14 executes a pre-crash control. In the pre-crash control, the occupant protection control unit 14 executes a pre-tensioning control that retracts the seat belt 19, for example.

Furthermore, when a collision is detected with the information from the sensor, the occupant protection control unit 14 executes an occupant protection control. In the occupant protection control, the occupant protection control unit 14 restricts the seat belt 19 from being sent out and deploys the front air bag 16.

Figure 5A:
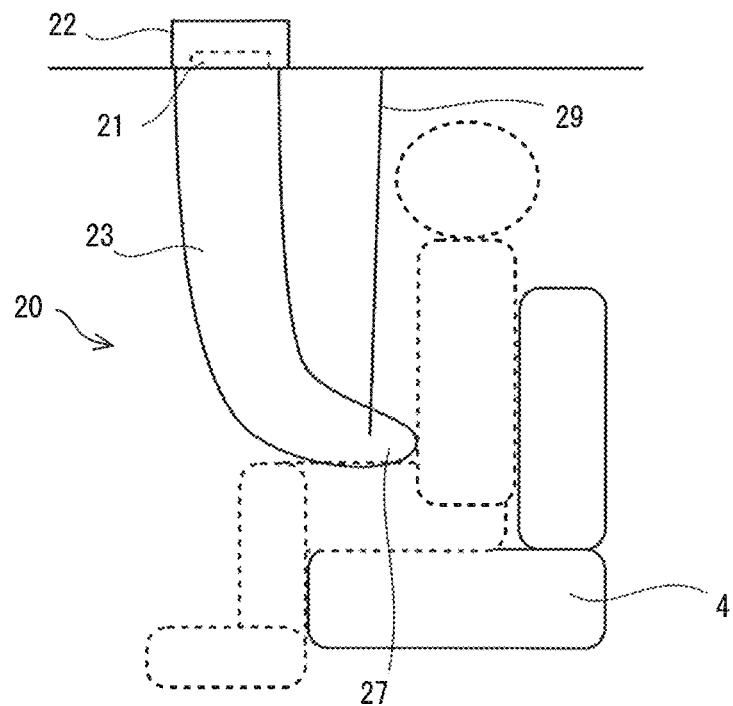
FIGS. 5A and 5B are a side view and a top view illustrating a state in which a vertical air bag device in FIG. 4 has been deployed.
Figure 5B:
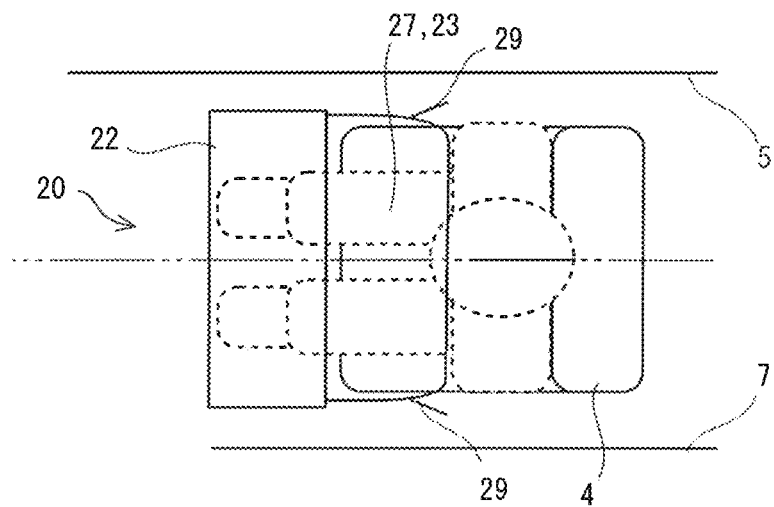

FIGS. 5A and 5B are a side view and a top view illustrating a state in which the vertical air bag device 20 in FIG. 4 has been deployed.

Figure 6:
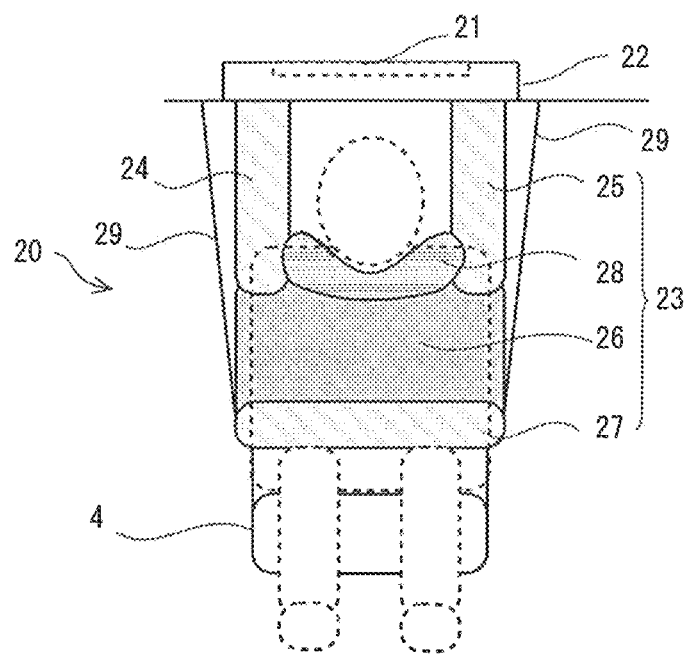
FIG. 6 is a front view illustrating a state in which the vertical air bag device in FIG. 4 has been deployed.

FIG. 6 is a front view illustrating the state in which the vertical air bag device 20 in FIG. 4 has been deployed.

The vertical air bag device 20 includes a main body 22 in which an inflator 21 is disposed, the vertical air bag 23 deployed from the main body 22 by gas generated by the inflator 21, and tethers 29 connected to the vertical air bag 23.

The main body 22 is disposed in the roof of the automobile 1 at a position in front of the seat 4. The main body 22 may be provided with a width corresponding to the left-right width of the seat 4.

The vertical air bag 23 is deployed downward from the main body 22 provided in the roof of the automobile 1. As illustrated in FIG. 6, the vertical air bag 23 includes a right shoulder front deployed portion 24, a left shoulder front deployed portion 25, a chest front deployed portion 26, and a head receiving deployed portion 28.

The right shoulder front deployed portion 24 is a portion that is deployed above the right end portion of the seat 4 and is deployed downward from the main body 22 provided in the roof of the automobile 1 to the height of the right shoulder of the occupant seated in the seat 4. The right shoulder front deployed portion 24 is deployed in front of the right shoulder of the occupant seated in the seat 4.

The left shoulder front deployed portion 25 is a portion that is deployed above the left end portion of the seat 4 and is deployed downward from the main body 22 provided in the roof of the automobile 1 to the height of the left shoulder of the occupant seated in the seat 4. The left shoulder front deployed portion 25 is deployed in front of the left shoulder of the occupant seated in the seat 4.

The chest front deployed portion 26 is connected to a lower end of the right shoulder front deployed portion 24 and a lower end of the left shoulder front deployed portion 25 and is a portion that is deployed in front of the chest of the occupant, which is seated in the seat 4, at a width that corresponds to the left-right width of the seat 4. A deployed direction distal end portion 27 of the chest front deployed portion 26 that is to be positioned on the lower end side in the deployment direction has a length that reaches below the seat surface of the seat 4. The vertical air bag 23 is formed so that the deployed length in the up-down direction is longer than the length between the roof of the automobile 1 and the seat surface of the seat 4.

The head receiving deployed portion 28 is a portion that is deployed to a portion above the chest front deployed portion 26 and between the right shoulder front deployed portion 24 and the left shoulder front deployed portion 25. The head receiving deployed portion 28 has a curved and recessed shape that corresponds to the shape of the chin of the occupant.

Furthermore, the right shoulder front deployed portion 24 and the left shoulder front deployed portion 25 are deployed in a more deformable manner with respect to the chest front deployed portion 26. The deployed portion becomes more easily deformed by reducing the deploying pressure or forming the deployed bag body with a material that has high elasticity, for example. Note that the right shoulder front deployed portion 24, the left shoulder front deployed portion 25, the chest front deployed portion 26, and the head receiving deployed portion 28 may be formed as a single air chamber in which the above are in communication with each other. In such a case as well, each of the deployed portions may be deployed at different pressures by providing pneumatic on-off valves between the deployed portions.

The tethers 29 connect portions of the roof of the automobile 1 that are above the shoulders of the occupant seated in the seat 4 and the deployed direction distal end portion 27 of the vertical air bag 23.

The tethers 29 are attached to the roof of the automobile 1 at portions above the seat 4 that are behind the vertical air bag 23. Note that the tethers 29 may be attached to portions behind the portion above the seat 4.

The tethers 29 are formed shorter than the distance between the roof of the automobile 1 and the seat surface of the seat 4. In other words, the tethers 29 are shorter than the length of the deployed vertical air bag 23.

FIGS. 7A to 7D are explanatory drawings illustrating a deployment process of the vertical air bag device 20 in FIG. 4.

Figure 7A:
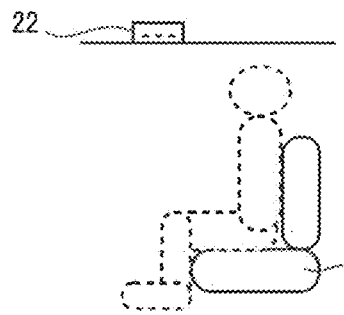
FIGS. 7A to 7D are explanatory drawings illustrating a deployment process of the vertical air bag device in FIG. 4.

Before the collision illustrated in FIG. 7A, the occupant protection control unit 14 determines a possibility of a collision. Subsequently, if there is a possibility of a collision, the occupant protection control unit 14 deploys the vertical air bag device 20.

Figure 7B:
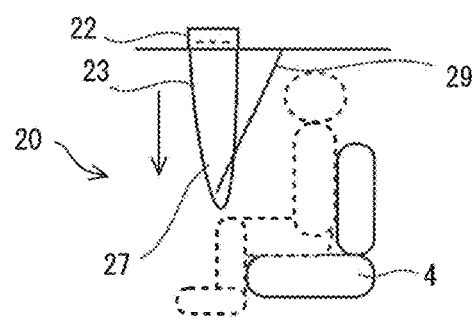

As illustrated in FIG. 7B, the vertical air bag 23 starts to be deployed downward from a position in the roof of the automobile 1 above the shoulders of the occupant seated in the seat 4 of the automobile 1. Furthermore, the short tethers 29 are fully stretched while the vertical air bag 23 is developed.

Figure 7C:
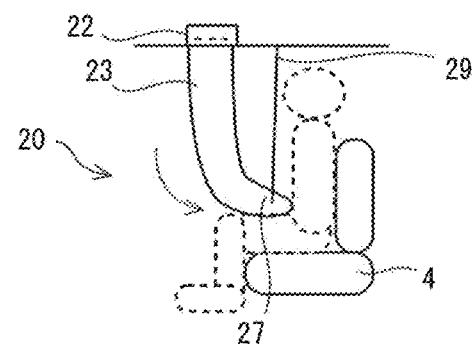

At a portion in front of the upper body of the occupant seated in the seat 4, the vertical air bag 23 that is further deployed thereafter is bent with the tension of the tethers 29 so that the deployed direction distal end portion 27 is oriented towards the waist of the occupant. Furthermore, in the above bent state in which the vertical air bag 23 is curved in the front-rear direction, as illustrated in FIG. 7C, the deployed direction distal end portion 27 comes into contact with the waist or a portion near the front of the waist of the occupant seated in the seat 4 so as to strike thereagainst.

With the above, the waist of the occupant seated in the seat 4 is restrained at the sitting position of the seat 4 before the collision.

Figure 7D:
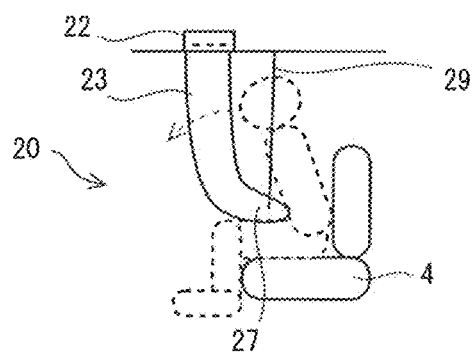

Subsequently, when the actual collision takes place, as illustrated in FIG. 7D, the upper body of the occupant seated in the seat 4 collapses forward while the waist is restrained at the sitting position of the seat 4. The upper body collapses into the vertical air bag 23.

Note that the timing at which the vertical air bag 23 is deployed may be a timing at which the actual collision is detected. In such a case as well, during the collision, the vertical air bag 23 is capable of restraining the waist of the occupant seated in the seat 4 from sliding forward and, moreover, is capable of supporting the upper body that is collapsing due to the impact of the collision.

As described above, the occupant protection device 10 according to the present example includes the vertical air bag 23 deployed downward at least from above the shoulders of the occupant seated in the seat 4 of the automobile 1. Furthermore, during the deployment, the vertical air bag 23 is bent so that the deployed direction distal end portion 27 is oriented towards the waist of the occupant at a portion in front of the upper body of the occupant seated in the seat 4. In the state in which the vertical air bag 23 is bent, the deployed direction distal end portion 27 comes into contact to a frontal portion of the occupant seated in the seat 4 during the deployment. By having the deployed direction distal end portion 27 of the bent vertical air bag 23 that is being deployed come in contact with the frontal portion of the occupant seated in the seat 4 in the above manner, the occupant seated in the seat 4 is restrained. The occupant is restrained by, for example, the high deploying pressure that deploys the vertical air bag 23 further and the restoring force of the bent vertical air bag 23 returning from the bent state to the original shape.

Moreover, since the frontal portion of the occupant seated in the seat 4 is restrained by the deployed direction distal end portion 27 of the bent vertical air bag 23 that is being deployed, the occupant seated in the seat 4 can be restrained regardless of the position of the adjusted seat 4 in the front-rear direction with respect to the vehicle body 3, the sitting position and the posture of the occupant in the seat 4 before the deployment, and the body shape of the occupant.

As a result, the body of the occupant, particularly, the waist is held at the position where the deployed direction distal end portion 27 of the vertical air bag 23 is positioned when the deployed direction distal end portion 27 comes into contact with the waist of the occupant. Movement, such as to the front, becomes difficult during the collision. During a front collision, for example, the upper body of the occupant collapses forward about the waist that is stable at the sitting position; accordingly, the behavior of the upper body of the occupant during the collision becomes close to the desired behavior. Furthermore, the upper body collapsing forward, for example, about the waist at the sitting position is supported by the vertical air bag 23 and the impact can be absorbed.

Particularly, by further developing the deployed direction distal end portion 27 while the vertical air bag 23 is curved and bent in the front-rear direction, the deployed direction distal end portion 27 strikes the waist or a portion near the front of the waist of the occupant seated in the seat 4. The waist is pressed by the deployed direction distal end portion 27 of the vertical air bag 23 striking the waist with a high deploying pressure from a set direction, namely, the front direction or the upper direction. The behavior of the waist becomes stable.

In the present example, the portions of the automobile 1 above the shoulders of the occupant seated in the seat 4 and the deployed direction distal end portion 27 of the vertical air bag 23 are connected with the tethers 29. Furthermore, the tethers 29 are formed shorter than the deployed length of the vertical air bag 23. As a result, the vertical air bag 23 that has started to deploy downward from above the occupant seated in the seat 4 of the automobile 1 can, with the tension of the tethers 29 described above, be bent so as to curve in the front-rear direction in the course of the development. The deployed direction distal end portion 27 of the vertical air bag 23 in the bent state can be deployed so as to strike the waist or a portion around the waist of the occupant seated in the seat 4. Furthermore, the upper body of the collapsing occupant can be supported and the impact can be absorbed with the tension of the tethers 29.

In the present example, the vertical air bag 23 that has started to deploy downward from the roof of the automobile 1 can be bent so as to curve rearwardly in the front-rear direction with the tethers 29 attached in the roof of the automobile 1 at a portion above the seat 4 and behind the vertical air bag 23 and, in the bent state, can strike the waist or a vicinity of the waist of the occupant seated in the seat 4 from the front. Accordingly, forward movement of the waist of the occupant can be suppressed intensely.

In the present example, the right shoulder front deployed portion 24 and the left shoulder front deployed portion 25 are deployed in a more deformable manner with respect to the chest front deployed portion 26. Accordingly, the right shoulder front deployed portion 24 and the left shoulder front deployed portion 25 can be deformed when the chest front deployed portion 26 absorbs the impact on the upper body. As a result, the deformation of the chest front deployed portion 26 during the absorption of the impact can be suppressed and the upper body bending force generated when the chest front deployed portion 26 becomes deformed is not easily exerted to the upper body.

In the present example, the head receiving deployed portion 28 that is deployed above the chest front deployed portion 26 in a more deformable manner with respect to the chest front deployed portion 26 is provided. Accordingly, the impact on the head of the occupant can be absorbed by the head receiving deployed portion 28.

Second Example

An occupant protection device 10 according to a second example of the present disclosure will be described next.

In the description hereinafter, components that are similar to those of the first example will be denoted with reference numerals that are the same as those of the first example, and points that are different from the first example will be described mainly.

Figure 8:
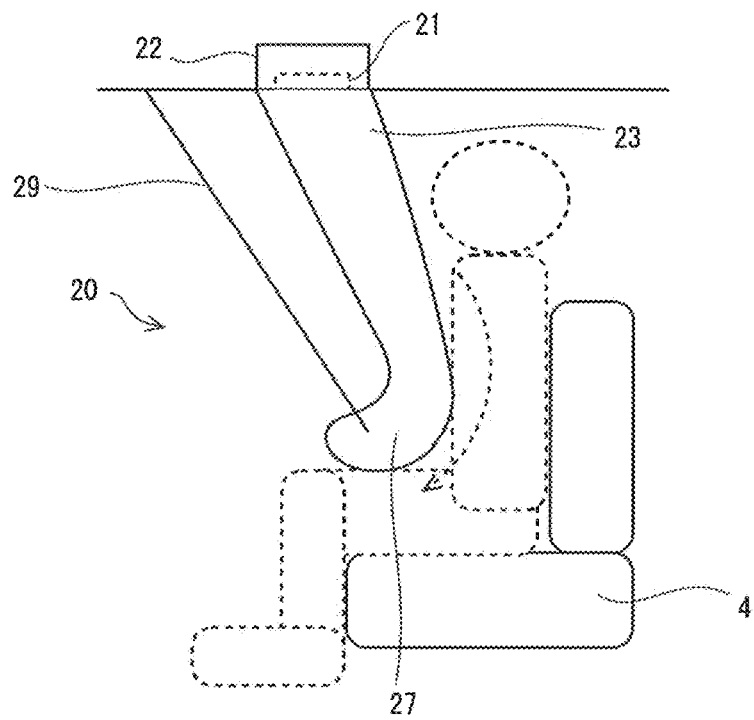
FIG. 8 is an explanatory drawing of an occupant protection device according to a second example.

FIG. 8 is an explanatory drawing of the occupant protection device 10 according to the second example.

In FIG. 8, the vertical air bag device 20 is attached to the roof of the automobile 1 at a portion above the front edge of the seat 4.

The tethers 29 are attached to the roof of the automobile 1 at portions in front of the vertical air bag 23.

Furthermore, the vertical air bag 23 starts to become deployed downward and rearward from the roof of the automobile 1.

Subsequently, the short tethers 29 become fully stretched while the vertical air bag 23 is developed.

At a portion in front of the waist of the occupant seated in the seat 4, the vertical air bag 23 that is further deployed thereafter is bent so that the deployed direction distal end portion 27 is oriented towards the front direction with respect to the occupant with the tension of the tethers 29. Furthermore, in the above bent state in which the vertical air bag 23 is curved in the front-rear direction, as illustrated in FIG. 8, the deployed direction distal end portion 27 strikes onto the thighs of the occupant seated in the seat 4. Furthermore, the bent portion of the vertical air bag 23 strikes a portion near the front of the waist. With the above, the waist of the occupant seated in the seat 4 is restrained at the sitting position of the seat 4.

Subsequently, when the actual collision takes place, the upper body of the occupant seated in the seat 4 collapses forward while the waist is restrained at the sitting position of the seat 4. The upper body collapses into the vertical air bag 23.

As described above, in the present example, the vertical air bag 23 that has started to deploy downward and rearward from the roof of the automobile 1 can be bent so as to curve forward in the front-rear direction with the tethers 29 attached in the roof of the automobile 1 at a portion in front of the vertical air bag 23 and, in the bent state, can strike the thighs of the occupant seated in the seat 4 so as to restrain the thighs from above. Moreover, since the curved vertical air bag 23 is positioned so as to stand in front of the upper body and the waist of the occupant, the upper body can be suppressed effectively from collapsing forward.

Note that the occupant protection device 10 may be configured such that the deployment is completed when the deployed direction distal end portion 27 that is bent so as to be curved in the front-rear direction and that is deployed towards the waist strikes a portion near the front of the waist.

Third Example

An occupant protection device 10 according to a third example of the present disclosure will be described next.

In the description hereinafter, components that are similar to those of the first example will be denoted with reference numerals that are the same as those of the first example, and points that are different from the first example will be described mainly.

Figure 9:
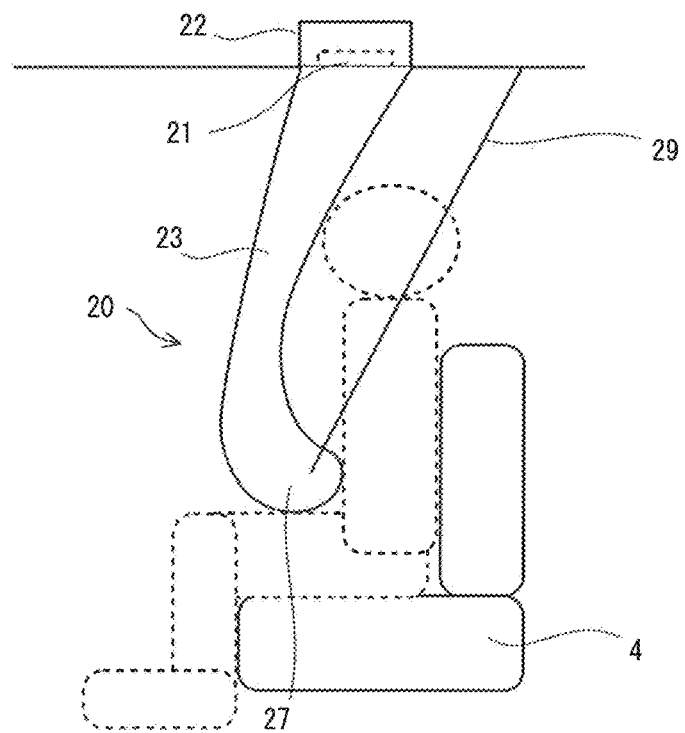
FIG. 9 is an explanatory drawing of an occupant protection device according to a third example.

FIG. 9 is an explanatory drawing of the occupant protection device 10 according to the third example.

In FIG. 9, the vertical air bag device 20 is attached to the roof of the automobile 1 at a portion above the seat 4. Note that the vertical air bag device 20 may be attached on the rear side with respect to the seat 4.

The tethers 29 are attached to the roof of the automobile 1 at portions behind the vertical air bag 23. The tethers 29 are attached on the rear side with respect to the seat 4.

Furthermore, the vertical air bag 23 starts to become deployed downward and forward from the roof of the automobile 1.

Subsequently, the short tethers 29 become fully stretched while the vertical air bag 23 is developed.

At a portion in front of the upper body of the occupant seated in the seat 4, the vertical air bag 23 that is further deployed thereafter is bent with the tension of the tethers 29 so that the deployed direction distal end portion 27 is oriented towards the waist of the occupant. Furthermore, in the above bent state in which the vertical air bag 23 is curved in the front-rear direction, as illustrated in FIG. 9, the deployed direction distal end portion 27 strikes onto the thighs of the occupant seated in the seat 4. Furthermore, the deployed direction distal end portion 27 of the vertical air bag 23 strikes a portion near the front of the waist. With the above, the waist of the occupant seated in the seat 4 is restrained at the sitting position of the seat 4.

Subsequently, when the actual collision takes place, the upper body of the occupant seated in the seat 4 collapses forward while the waist is restrained at the sitting position of the seat 4. The upper body collapses into the vertical air bag 23.

As described above, in the present example, the vertical air bag 23 that has started to deploy downward and forward from the roof of the automobile 1 can be bent so as to curve rearwardly in the front-rear direction with the tethers 29 attached in the roof of the automobile 1 at a portion behind the vertical air bag 23 and the seat 4 and, in the bent state, can strike the waist or a vicinity of the thigh of the occupant seated in the seat 4 from the upper front direction. Accordingly, forward movement of the waist of the occupant can be suppressed intensely. Moreover, since the curved vertical air bag 23 is positioned as if standing in front of the upper body and the waist of the occupant, the upper body can be suppressed effectively from collapsing forward.

Fourth Example

An occupant protection device 10 according to a fourth example of the present disclosure will be described next.

In the description hereinafter, components that are similar to those of the first example will be denoted with reference numerals that are the same as those of the first example, and points that are different from the first example will be described mainly.

Figure 10:
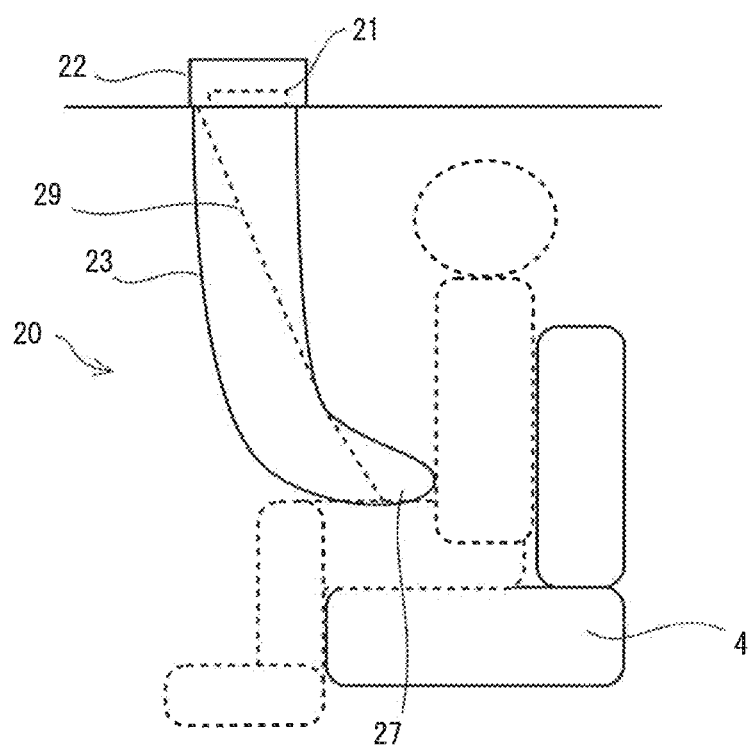
FIG. 10 is an explanatory drawing of an occupant protection device according to a fourth example.

FIG. 10 is an explanatory drawing of the occupant protection device 10 according to the fourth example.

In FIG. 10, the vertical air bag device 20 is attached to the roof of the automobile 1 at a portion in front of a portion above the front edge of the seat 4.

Furthermore, the tethers 29 are provided inside the vertical air bag 23. The tethers 29 are connected between a front upper end of the vertical air bag 23 and a front side of the deployed direction distal end portion 27. The length of the section of the vertical air bag 23 between the connections are longer than the length of the tethers 29.

Furthermore, the vertical air bag 23 starts to become deployed downward from the roof of the automobile 1.

Subsequently, the short tethers 29 become fully stretched while the vertical air bag 23 is developed.

At a portion in front of the upper body of the occupant seated in the seat 4, the vertical air bag 23 that is further deployed thereafter is bent with the tension of the tethers 29 provided inside the vertical air bag 23 so that the deployed direction distal end portion 27 is oriented towards the waist of the occupant. Furthermore, in the above bent state in which the vertical air bag 23 is curved in the front-rear direction, as illustrated in FIG. 10, the deployed direction distal end portion 27 strikes onto the thighs of the occupant seated in the seat 4. Furthermore, the deployed direction distal end portion 27 of the vertical air bag 23 strikes a portion in front of the waist. With the above, the waist of the occupant seated in the seat 4 is restrained at the sitting position of the seat 4.

Subsequently, when the actual collision takes place, the upper body of the occupant seated in the seat 4 collapses forward while the waist is restrained at the sitting position of the seat 4. The upper body collapses into the vertical air bag 23.

As described above, in the present example, the vertical air bag 23 that has started to deploy downward from the roof of the automobile 1 is bent so as to be curved in the front-rear direction in the course of the deployment with the tension of the tethers 29 provided inside the vertical air bag 23. As a result, the deployed direction distal end portion 27 of the vertical air bag 23 in the bent state can be deployed so as to strike the waist or a portion around the waist of the occupant seated in the seat 4.

Fifth Example

An occupant protection device 10 according to a fifth example of the present disclosure will be described next.

In the description hereinafter, components that are similar to those of the first example will be denoted with reference numerals that are the same as those of the first example, and points that are different from the first example will be described mainly.

Figure 11A:
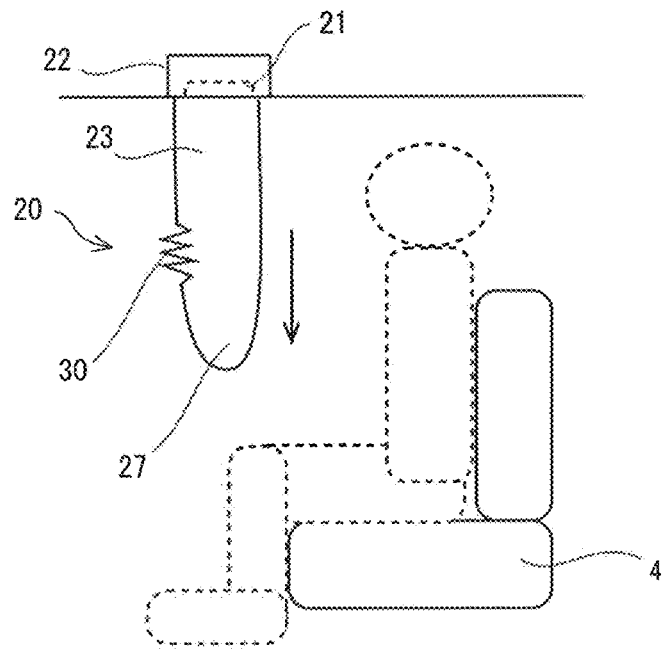
FIGS. 11A and 11B are explanatory drawings of an occupant protection device according to a fifth example.
Figure 11B:
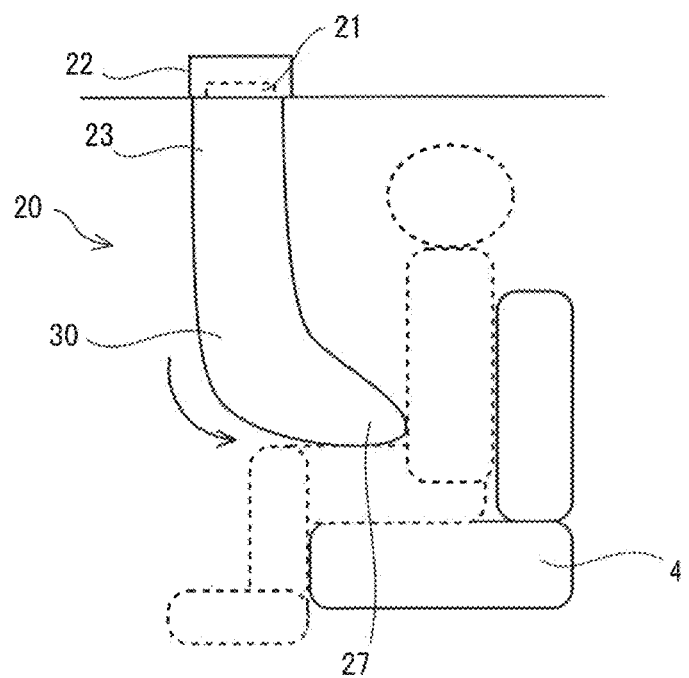

FIGS. 11A and 11B are explanatory drawings of the occupant protection device 10 according to the fifth example. FIG. 11A illustrates a state during deployment, and FIG. 11B illustrates a deployed state.

In FIGS. 11A and 11B, the vertical air bag device 20 is attached to the roof of the automobile 1 at a portion in front of a portion above the front edge of the seat 4.

Furthermore, a bellows portion 30 is provided on the front side of the vertical air bag 23.

Furthermore, as illustrated in FIG. 11A, the vertical air bag 23 starts to become deployed downward from the roof of the automobile 1.

Subsequently, the bellows portion 30 becomes extended in the vertical air bag 23 in FIG. 11B. With the above, the front side of the vertical air bag 23 is deployed longer in length than the rear side. The vertical air bag 23 becomes bent in front of the upper body of the occupant seated in the seat 4 so that the deployed direction distal end portion 27 is deployed rearward. Furthermore, in the above bent state in which the vertical air bag 23 is curved in the front-rear direction, the deployed direction distal end portion 27 strikes a portion in front of the waist of the occupant seated in the seat 4. With the above, the waist of the occupant seated in the seat 4 is restrained at the sitting position of the seat 4.

Subsequently, when the actual collision takes place, the upper body of the occupant seated in the seat 4 collapses forward while the waist is restrained to the sitting position of the seat 4. The upper body collapses into the vertical air bag 23.

As described above, in the present example, the vertical air bag 23 that has started to deploy downward from the roof of the automobile 1 is bent so as to be curved in the front-rear direction by having the front side of the vertical air bag 23 be developed longer in length than the rear side. As a result, the deployed direction distal end portion 27 of the vertical air bag 23 in the bent state can be deployed so as to strike the waist or a portion around the waist of the occupant seated in the seat 4.

The examples above are preferable examples of the present disclosure; however, the present disclosure is not limited by the examples and may be modified and changed in various ways within the scope of the disclosure.

In the examples described above, the vertical air bag 23 deployed downward in the up-down direction is bent in front of the occupant seated in the seat 4 and the lower end of the vertical air bag 23 abuts against the upper surfaces of the thighs of the occupant.

Other than the above, for example, the vertical air bag 23 may be deployed so as to be bent at a portion in front of the waist of the occupant seated in the seat 4 while the lower portion of the vertical air bag 23 is spaced away from the upper surfaces of the thighs of the occupant.

The invention claimed is:

1. An occupant protection device comprising:
a vertical air bag deployable downward from a roof above an occupant seated in a seat of a vehicle,
wherein during deployment, the vertical air bag is bent in such a manner that a deployed direction distal end portion is, at a portion in front of an upper body of the occupant seated in the seat, oriented towards a waist of the occupant, and
wherein in a state in which the vertical air bag is bent, the deployed direction distal end portion comes in contact with a frontal portion of the occupant seated in the seat during the deployment, and the occupant protection device further comprises;
a tether that connects the roof of the vehicle and the deployed direction distal end portion of the vertical air bag, the tether having a length shorter than a length of the vertical air bag that has been deployed, and
wherein the vertical air bag is bent so as to be curved in a front-rear direction of the vehicle with tension of the tether during the deployment such that the deployed direction distal end portion is directed along the front-rear direction.

2. The occupant protection device according to claim 1, wherein by further developing the deployed direction distal end portion while the vertical air bag is curved and bent in a front-rear direction, the deployed direction distal end portion strikes the waist or a portion near a front of the waist of the occupant seated in the seat.

3. The occupant protection device according to claim 1, wherein the vertical air bag starts to become deployed downward from the roof of the vehicle, and
wherein the tether is attached to the roof of the vehicle at a portion above or behind the seat, which is behind the vertical air bag.

4. The occupant protection device according to claim 2, wherein the vertical air bag starts to become deployed downward from the roof of the vehicle, and
wherein the tether is attached to the roof of the vehicle at a portion above or behind the seat, which is behind the vertical air bag.

5. The occupant protection device according to claim 1, wherein the vertical air bag starts to become deployed downward and rearward from the roof of the vehicle, and
wherein the tether is attached to the roof of the vehicle at a portion in front of the vertical air bag.

6. The occupant protection device according to claim 2, wherein the vertical air bag starts to become deployed downward and rearward from the roof of the vehicle, and
wherein the tether is attached to the roof of the vehicle at a portion in front of the vertical air bag.

7. The occupant protection device according to claim 1, wherein the vertical air bag starts to become deployed downward and forward from the roof of the vehicle, and
wherein the tether is attached to the roof of the vehicle at a portion behind the vertical air bag and the seat.

8. The occupant protection device according to claim 2, wherein the vertical air bag starts to become deployed downward and forward from the roof of the vehicle, and
wherein the tether is attached to the roof of the vehicle at a portion behind the vertical air bag and the seat.

9. The occupant protection device according to claim 1, wherein the vertical air bag starts to become deployed downward from the roof of the vehicle and is bent so as to be curved in a front-rear direction with tension of the tether provided inside the vertical air bag during the deployment.

10. The occupant protection device according to claim 2, wherein the vertical air bag starts to become deployed downward from the roof of the vehicle and is bent so as to be curved in a front-rear direction with tension of the tether provided inside the vertical air bag during the deployment.

11. The occupant protection device according to claim 1, wherein the vertical air bag comprises
a right shoulder front deployed portion and a left shoulder front deployed portion that are deployable from the roof of the vehicle towards portions in front of shoulders of the occupant seated in the seat, and
a chest front deployed portion connected to a lower end of the right shoulder front deployed portion and a lower end of the left shoulder front deployed portion, the chest front deployed portion being deployable to a portion in front of a chest of the occupant seated in the seat,
wherein the right shoulder front deployed portion and the left shoulder front deployed portion are deployed in a more deformable manner with respect to the chest front deployed portion.

12. The occupant protection device according to claim 2, wherein the vertical air bag comprises
a right shoulder front deployed portion and a left shoulder front deployed portion that are deployable from the roof of the vehicle towards portions in front of shoulders of the occupant seated in the seat, and
a chest front deployed portion connected to a lower end of the right shoulder front deployed portion and a lower end of the left shoulder front deployed portion, the chest front deployed portion being deployable to a portion in front of a chest of the occupant seated in the seat,
wherein the right shoulder front deployed portion and the left shoulder front deployed portion are deployed in a more deformable manner with respect to the chest front deployed portion.

13. The occupant protection device according to claim 11, wherein the vertical air bag comprises
a head receiving deployed portion disposed at a portion that is above the chest front deployed portion and that is between the right shoulder front deployed portion and the left shoulder front deployed portion, the head receiving deployed portion being deployable in a more deformable manner with respect to the chest front deployed portion.

14. The occupant protection device according to claim 12, wherein the vertical air bag comprises
a head receiving deployed portion disposed at a portion that is above the chest front deployed portion and that is between the right shoulder front deployed portion and the left shoulder front deployed portion, the head receiving deployed portion being deployable in a more deformable manner with respect to the chest front deployed portion.

15. The occupant protection device of claim 1, wherein the tether connects to the roof of the vehicle and an outer side of the deployed direction distal end portion in a width direction of the vehicle.

16. The occupant protection device of claim 1, wherein the vertical air bag starts to deploy downward from the roof of the vehicle in a vertical direction of the vehicle so that the deployed direction distal end portion is oriented downward in the vertical direction of the vehicle, and
wherein the vertical air bag is bent so that the deployed direction distal end is oriented in the front-rear direction of the vehicle with tension of the stretched tether.

17. The occupant protection device of claim 1, wherein the tether length is shorter than a length between the roof of the vehicle and a seat surface of the seat, and
wherein the vertical length of the vertical air bag in the deployed state is longer than the length between the roof of the vehicle and the seat surface of the seat.

18. The occupant protection device of claim 1, wherein the deployed direction distal end portion, in extending along the front-rear direction, is directed toward the occupant.

19. The occupant protection device of claim 1, wherein the deployed direction distal end portion, in extending along the front-rear direction, is directed away from the occupant.

20. An occupant protection device comprising:
a vertical air bag deployable downward at least from above a shoulder of an occupant seated in a seat of a vehicle,
wherein during deployment, the vertical air bag is bent in such a manner that a deployed direction distal end portion is, at a portion in front of an upper body of the occupant seated in the seat, oriented towards a waist of the occupant, and
wherein in a state in which the vertical air bag is bent, the deployed direction distal end portion comes in contact with a frontal portion of the occupant seated in the seat during the deployment, and
wherein the vertical air bag starts to become deployed downward from a roof of the vehicle and is bent so as to be curved in a front-rear direction by having a front surface of the vertical air bag become deployed longer in length than a rear surface of the vertical air bag based on a bellows portion provided in the front surface of the vertical air bag and such that the deployed direction distal end portion is directed along the front-rear direction.

* * * * *